(12) United States Patent
Schnabel, Jr.

(10) Patent No.: US 9,926,218 B2
(45) Date of Patent: Mar. 27, 2018

(54) GLASS SHEET FORMING SYSTEM

(71) Applicant: GLASSTECH, INC., Perrysburg, OH (US)

(72) Inventor: James P. Schnabel, Jr., Holland, OH (US)

(73) Assignee: GLASSTECH, INC., Perrysburg, OH (US)

( * ) Notice: Subject to any disclaimer, the term of this patent is extended or adjusted under 35 U.S.C. 154(b) by 124 days.

(21) Appl. No.: 14/929,780

(22) Filed: Nov. 2, 2015

(65) Prior Publication Data

US 2017/0121211 A1    May 4, 2017

(51) Int. Cl.
| | | |
|---|---|---|
| C03B 25/08 | (2006.01) | |
| C03B 35/14 | (2006.01) | |
| C03B 27/012 | (2006.01) | |

(52) U.S. Cl.
CPC ............. C03B 35/14 (2013.01); C03B 25/08 (2013.01); C03B 27/012 (2013.01); *C03B 2225/02* (2013.01)

(58) Field of Classification Search
CPC ...... C03B 23/0093; C03B 35/14; B65B 59/04
See application file for complete search history.

(56) References Cited

U.S. PATENT DOCUMENTS

| | | | | |
|---|---|---|---|---|
| 1,742,652 | A | * | 1/1930 | Goodwillie ............. C03B 25/08 65/258 |
| 4,185,986 | A | | 1/1980 | Frank |
| 4,433,993 | A | | 2/1984 | Frank |
| 4,575,390 | A | | 3/1986 | McMaster |
| 4,983,202 | A | * | 1/1991 | Deb ........................ C03B 29/08 65/104 |
| 5,194,083 | A | * | 3/1993 | Lehto ................. C03B 23/0258 65/107 |
| 5,254,152 | A | | 10/1993 | Vehmas |
| 6,176,668 | B1 | * | 1/2001 | Kurita ............... H01L 21/67748 198/346.2 |
| 6,425,269 | B1 | | 7/2002 | McMaster et al. |
| 6,513,348 | B2 | | 2/2003 | Shetterly et al. |
| 6,543,255 | B2 | | 4/2003 | Bennett et al. |
| 6,573,484 | B1 | | 6/2003 | Yue |
| 6,578,383 | B2 | | 6/2003 | Bennett et al. |
| 6,729,160 | B1 | * | 5/2004 | Nitschke ............. C03B 23/0302 425/182 |
| 2012/0289388 | A1 | * | 11/2012 | Ehrmann ................ B29C 33/30 483/1 |
| 2012/0318954 | A1 | * | 12/2012 | Overley .................. B65B 59/04 248/639 |

FOREIGN PATENT DOCUMENTS

| | | |
|---|---|---|
| DE | 69825185 T2 | 8/2005 |
| EP | 1397313 B1 | 11/2010 |

OTHER PUBLICATIONS

PCT Transmittal of International Search Report and Written Opinion of the International Searching Authority dated Jan. 13, 2017, Application No. PCT/US16/59052, Applicant Glasstech, Inc., 7 pages.

* cited by examiner

*Primary Examiner* — John Hoffmann
(74) *Attorney, Agent, or Firm* — Brooks Kushman P.C.

(57) ABSTRACT

A glass sheet forming system (10) has two parallel forming lines (12) that can utilize any two of three forming stations (18) to provide versatility in use for forming different glass sheet jobs of different sizes and shapes while reducing switchover time from one job to the next.

9 Claims, 4 Drawing Sheets

GLASS SHEET FORMING SYSTEM

TECHNICAL FIELD

This invention relates to a glass sheet forming system that has versatility in use for economically forming different glass sheet jobs of different sizes and shapes.

BACKGROUND

Glass sheet forming systems conventionally include a furnace for heating glass sheets for forming, a forming station that cyclically receives the heated glass sheets from the furnace to provide the forming and a cooling station located downstream from the forming station to provide cooling that may be slow cooling for annealing, faster cooling for heat strengthening or rapid cooling for tempering. The most efficient operation of such glass sheet forming stations takes place with the least possible downtime between switching from one job to another. Such job switching was originally accomplished by changing one or more molds utilized to provide the glass sheet forming, but such mold switching changes require significant downtime, four to six hours or more, that necessarily increases the cost of each formed glass sheet produced. To reduce the downtime, a pair of forming stations that can be moved sideways along the length of the glass sheet forming system for use of one or the other have also more recently been utilized, which is more economical than having two systems because the cost of the forming stations relative to the cost of the furnaces and cooling stations is much less and reduces the downtime since any mold changing can be performed when another production job is being performed.

Prior art glass sheet forming systems are disclosed by: U.S. Pat. No. 6,543,255 Bennett et al. which discloses a roll bed having detachable drive wheel assemblies that permit a lower press ring of varying shapes to be utilized in the forming; and U.S. Pat. No. 6,513,348 Shetterly et al. which discloses cooling of a formed glass sheet after the forming, both of which patents are assigned to the assignee of the application and are hereby incorporated by reference.

SUMMARY

An object of the present invention is to provide an improved glass sheet forming system that has versatility in use in performing different glass sheet jobs of different sizes and shapes with reduced downtime so as to provide economy and thus cost reduction of the formed glass product.

In carrying out the above object, a glass sheet forming system constructed according to the invention includes a pair of glass sheet forming lines extending alongside each other along a direction of conveyance of the forming system. Each of the forming lines includes: a heating furnace for heating glass sheets; a forming location downstream along the direction of conveyance from the furnace which cyclically supplies heated glass sheets to the forming location; and a cooling station located downstream along the direction of conveyance from the forming location to cyclically receive formed glass sheets therefrom for cooling. The forming system also includes three forming stations, any two of which can be respectively positioned at the forming locations of the pair of forming lines. Three control assemblies of the forming system are respectively associated with the three forming stations and each includes: an upwardly extending stanchion having an upper end; a horizontal beam having an elongated length including a distal end having a pivotal connection to its associated forming station; a bearing assembly that mounts the horizontal beam on the upper end of the stanchion for pivotal movement about an associated vertical axis and for horizontal movement along its length; and a wire bundle connected to its associated forming station at the distal end of the horizontal beam and extending therefrom to the stanchion to provide control of the forming station. A control system of the forming system is connected to the wire bundles to operate the pair of forming lines including the heating furnaces, the selected two forming stations respectively in the forming locations, and the cooling stations.

As disclosed, the forming station includes a pair of storage locations at either of which any one of the forming stations not being used can be stored and at which any two of the forming stations not being used can be stored.

As also disclosed the upper end of the stanchion of one of the control assemblies is located higher than the upper ends of the stanchions of the other two control assemblies so the horizontal beam of the one control assembly is movable above the horizontal beams of the other two control assemblies during forming station movement.

Additionally, the forming station includes a rail assembly having rails and a turntable on which the forming stations are movable within the forming system. The stanchions of two of the control assemblies are disclosed as respectively located upstream and downstream from the turntable along the direction of conveyance of the forming lines, and the stanchion of the other control assembly is located adjacent the stanchion of one of those two control assemblies. More specifically, the stanchions of the two control assemblies located upstream and downstream from the turntable are aligned with the turntable along the direction of conveyance and the stanchion of the other control assembly is located laterally relative to the direction of conveyance to one side of the stanchion of one of those two control assemblies and the upper end thereof is higher than the upper ends of the stanchions of the two control assemblies so the horizontal beam thereof is movable above the horizontal beams of the two control assemblies during forming station movement. Also, the pair of storage locations are located upstream and downstream from the turntable along the direction of conveyance of the forming lines to provide for storage of one or two of the forming stations not being used.

The glass sheet forming system as disclosed has a control system including first and second PLCs (i.e. programming logic controllers) for respectively operating the pair of forming lines, a control panel connected to the associated wire bundle of each forming station to control its operation, and a third PLC for operating the three forming stations through their respective control panels in respective cooperation with the forming lines.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
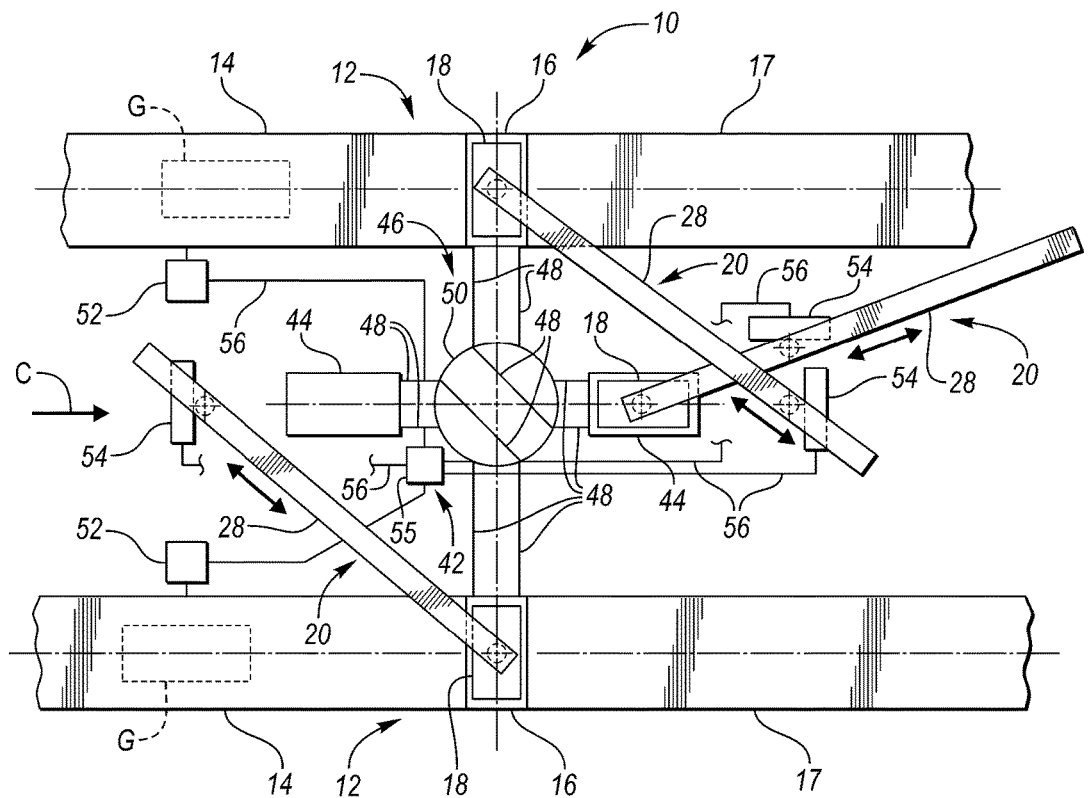
FIG. 1 is a schematic top plan view of a glass sheet forming system constructed according to the present invention to include a pair of glass sheet forming lines extending alongside each other and also including three forming stations any two of which can be utilized with the two forming lines at any given time, three control assemblies used in the operation of the forming stations, and a control system that operates the forming lines.

With reference to FIG. 1 of the drawings, a glass sheet forming system embodying the present invention is generally indicated by 10 and includes a pair of glass sheet forming lines 12 extending alongside each other along a direction of conveyance C of the forming system which forms glass sheets G in a cyclical manner. Each forming line 12 includes: a heating furnace 14 for heating glass sheets, a forming location 16 located downstream along the direction of conveyance C from the furnace 14, and a cooling station 17 spaced downstream along the direction of conveyance C from the heating furnace to define the forming location 16 and cyclically receiving formed glass sheets from the forming location for cooling. It should be noted that the furnace 14 may provide flat glass sheets to the forming location or may include a roll forming end for preforming the glass sheets, and it should also be mentioned that the cooling station 17 may perform slow cooling for annealing, faster cooling for heat strengthening or rapid cooling for tempering of the formed glass sheets.

Figure 3:
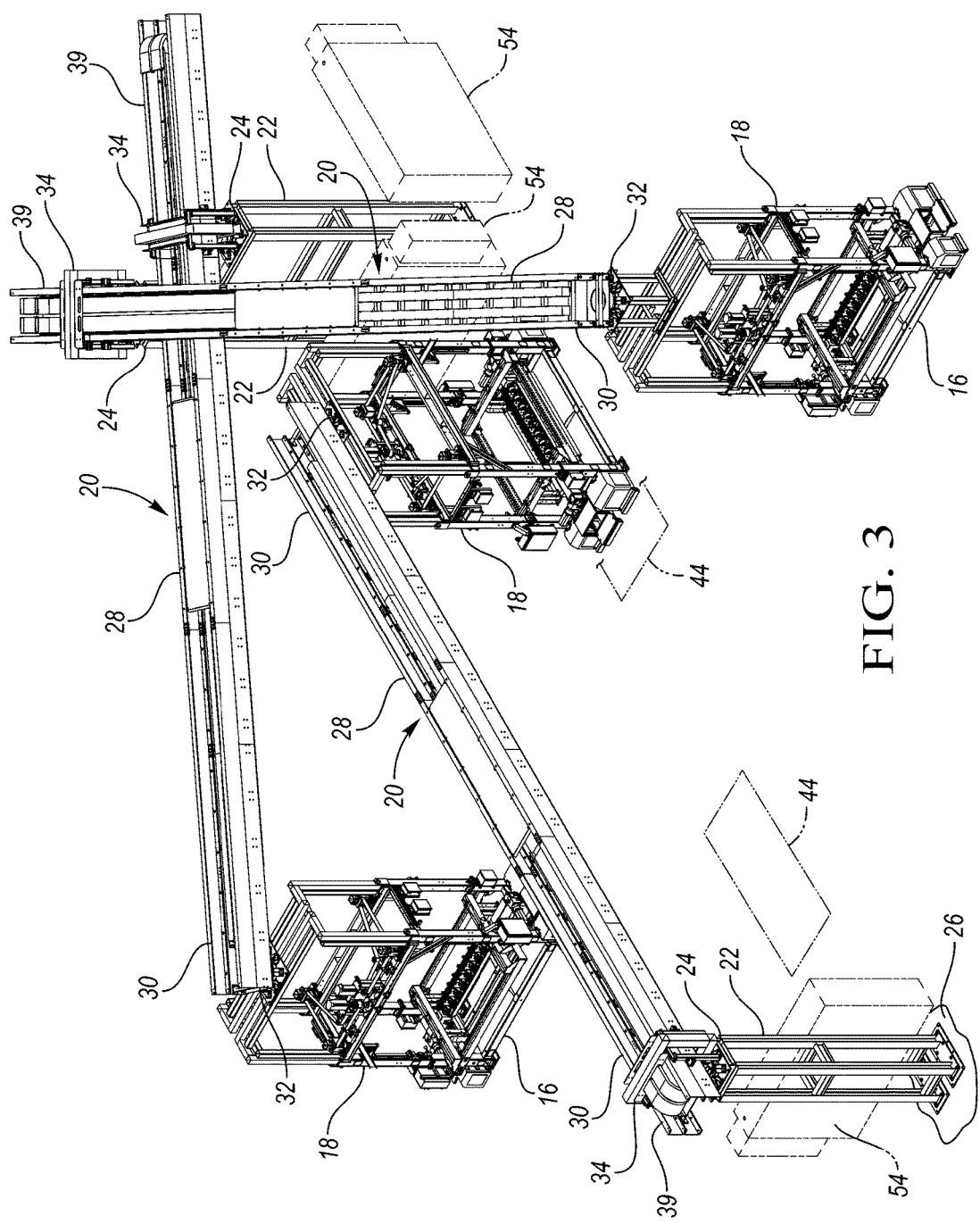
FIG. 3 is a more detailed perspective view of the control assemblies.
Figure 4:
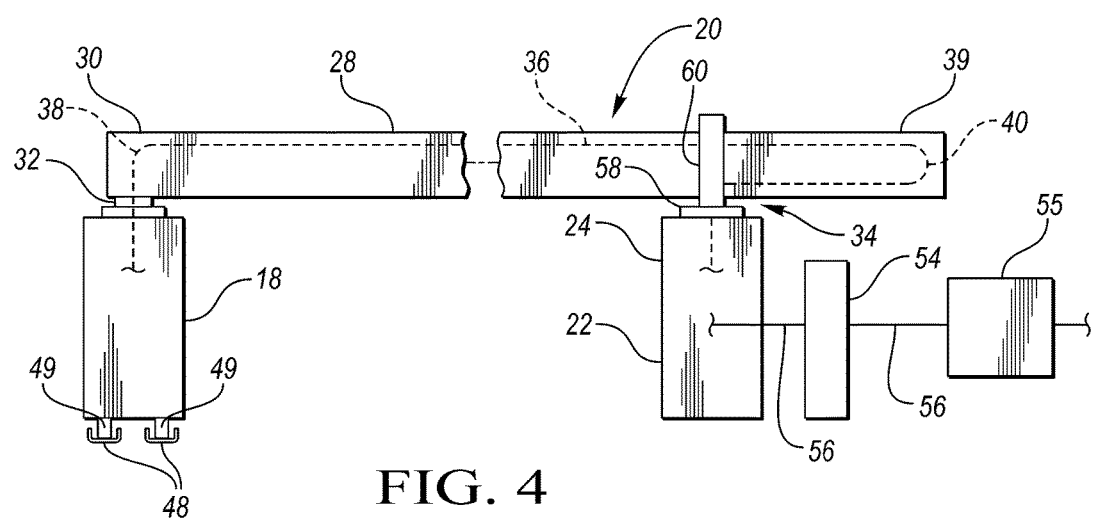
FIG. 4 is a somewhat schematic view of one of the control assemblies shown with a horizontal beam thereof in an extended position connected to the associated forming station at a remote location from an associated stanchion of the assembly.
Figure 5:
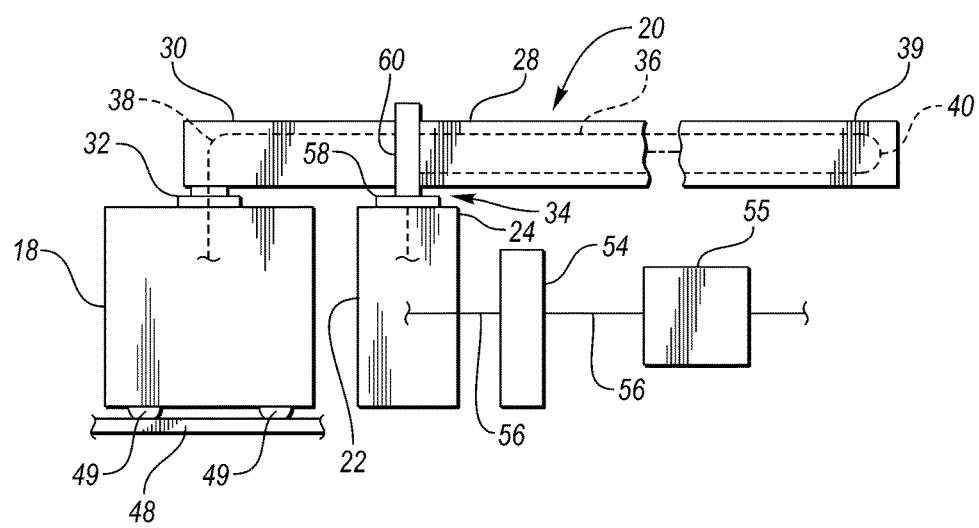
FIG. 5 is a view similar to FIG. 4 but with the horizontal beam in a retracted position extending from the stanchion to the associated forming station at a closer position.

With continuing reference to FIG. 1, the glass sheet forming system 10 also includes three forming stations 18, any two of which can be respectively positioned at the forming locations 16 of the pair of forming lines 12. These forming stations 18 are preferably press bending stations. Three control assemblies 20 of the forming system 10 are respectively associated with the three forming stations 18. Each of the control assemblies 20 includes an upwardly extending stanchion 22 which, as shown in FIG. 3, has an upper end 24 located above the factory floor 26. A horizontal beam 28 of each control assembly 20 has an elongated length including a distal end 30 having a pivotal connection 32 to its associated forming station 18 as shown in FIGS. 4 and 5, and each control assembly 20 also includes a bearing assembly 34 that, as schematically illustrated in FIGS. 4 and 5, mounts the horizontal beam 28 on the upper end 24 of the associated stanchion 22 for pivotal movement about an associated vertical axis and for horizontal movement along its length between the extended position shown in FIG. 4 and the retracted position shown in FIG. 5. A wire bundle 36 of each control assembly 20 is connected to its associated forming station 18 at the distal end 30 of the horizontal beam 28 and has a convention bendable support that limits bending at the bend 38. At the other horizontal beam end 39, the wire bundle 36 in its bendable wire support extends around a turn 40 back to the stanchion 22 to provide control of the forming station while still permitting movement of the forming station between different positions in the system closer and farther away from the stanchion. The wire bundles 36 include wires for providing electrical communication and any necessary vacuum or gas pressure tubes for operating the forming station during the glass forming operation.

With reference back to FIG. 1, a control system 42 of the forming system 10 is connected to the wire bundles 36 described above to operate the pair of forming lines 12 including the heating furnaces 14, the selected two forming stations 18 respectively in the forming locations 16, and the cooling stations 17.

As shown in FIG. 1, the glass sheet forming system 10 also includes a pair of storage locations 44 at either of which any one of the forming stations not being used can be stored and at which any two of the forming stations not being used can be stored.

Figure 2:
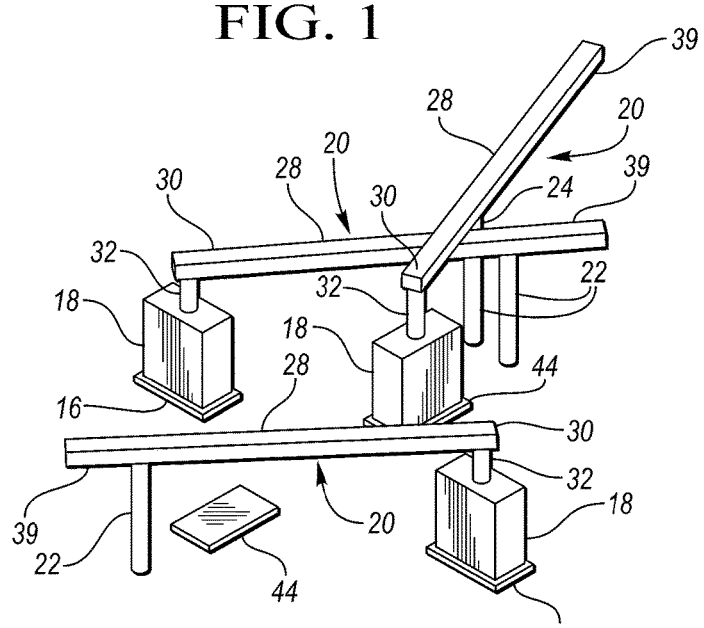
FIG. 2 is a schematic perspective view of the control assemblies that operate the forming stations of the forming system.

As illustrated in FIGS. 2 and 3, one of the stanchions 22 whose upper end is identified by the reference numeral 24 in FIG. 2 is higher than the upper ends of the other two stanchions 22 so the horizontal beam 28 of that control assembly is movable above the horizontal beams 28 of the other two control assemblies 20 during movement of the forming stations 16, which allows any two of the forming stations to be positioned in either forming line with the other forming station in one of the storage positions 16 while still having communication through the wire bundles described above to provide operation of the forming stations in both forming lines. It should be mentioned that it is also possible for only one of the forming lines 12 to be operated at any given time with the two other forming stations in the storage locations and located so there is no interference between their control assemblies 20.

The forming station includes a rail assembly 46 having rails 48 and a turntable 50 on which the forming stations are movable within the forming station between the forming locations 16 of the forming lines 12 and the storage locations 44. Each forming station 18 has power driven wheels 49 (FIGS. 4 and 5) for movement thereof along the rails 48.

The stanchions 22 of two of the control assemblies 20 are respectively located upstream and downstream from the turntable 50 along the direction of conveyance of the forming lines as shown and the stanchion of the other control assembly is located adjacent the stanchion of one of those two control assemblies. More specifically, stanchions 22 of the two control assemblies 20 upstream and downstream from the turntable 50 are aligned along the direction of conveyance C with the turntable 50 and the stanchion 22 of the other control assembly 20 is located laterally relative to the direction of conveyance C to one side of the stanchion of one of the two control assemblies aligned with the turntable and the upper end thereof is higher than the upper ends of the other two stanchions such that the horizontal beam of the higher upper ended stanchion is movable above the horizontal beams of the other two control assemblies during forming station movement to permit the movement to the different positions as described above. This construction permits any two of the forming stations 18 to be respectively used in the two forming lines 12 with communication by the control system for operation. Furthermore, the pair of storage locations 44 are located upstream and downstream from the turntable 50 along the direction of conveyance of the forming lines to provide for storage of one or even two of the forming stations not being used.

As illustrated in FIG. 1, the control system 42 of the forming system 10 includes first and second programmable logic controllers 52 (PLCs) for respectively operating the pair of forming lines 12 and also includes control panels 54 respectively connected to the associated wire bundles of each forming station 18 to control its operation under the control of a third PLC 55 through wire bundles 56 for operating the three forming stations through their respective control panels in respective cooperation with the forming lines.

Figure 6:
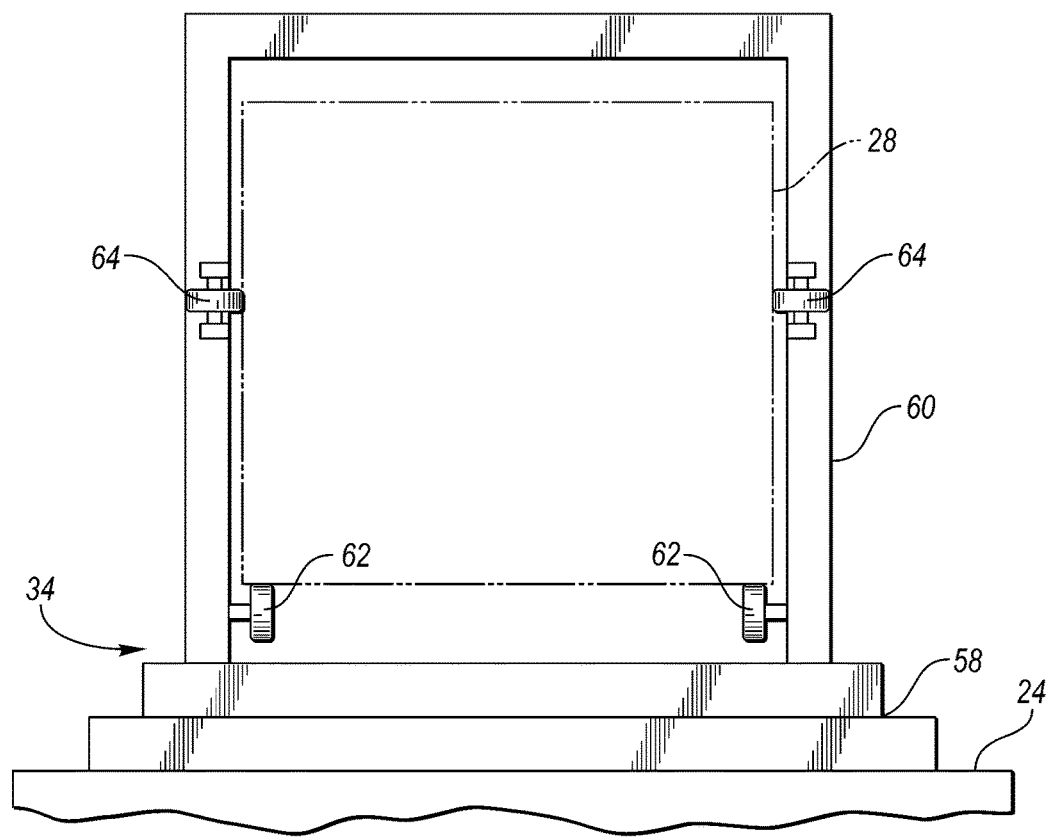
FIG. 6 is a schematic view taken along the direction of line 6-6 in FIG. 5 to illustrate a bearing assembly on the upper end of the stanchion for supporting the horizontal beam for horizontal and pivotal movement.

As illustrated in FIG. 6, the upper end 24 of each stanchion 22 includes a pivotal support 58 that mounts an inverted U shaped frame 60 having lower support rollers 62 that mount the horizontal beam 28 and having upper rollers 64 that provide lateral guiding. Both sets of rollers 62 and 64 can be provided at spaced positions along the length of the horizontal beam so as to facilitate its support and guided movement.

By the construction of the forming station as described above with the control assemblies, any two glass sheet forming jobs can be performed while a third forming station has its molds changed in order to reduce the time of job switching from one job to another at one of the forming lines. Thus, scheduling of the glass sheet forming jobs to be conducted timewise can reduce switchover time and thereby reduce the cost of each formed glass sheet produced.

While an exemplary embodiment is described above, it is not intended that this embodiment describes all possible forms of the invention. Rather, the words used in the specification are words of description rather than limitation, and it is understood that various changes may be made without departing from the spirit and scope of the invention.

The invention claimed is:

1. A glass sheet forming system comprising:
a pair of glass sheet forming lines extending alongside each other along a direction of conveyance of the forming system, each forming line including:
a heating furnace; and
a cooling station spaced downstream along the direction of conveyance from the heating furnace to define a forming location between the heating furnace and the cooling station;
three forming stations, any two of which can be respectively positioned at the forming locations of the pair of forming lines; and
three control assemblies respectively associated with the three forming stations and each including:
an upwardly extending stanchion having an upper end;
a horizontal beam having an elongated length including a distal end having a pivotal connection to its associated forming station;
a bearing assembly including a pivotal support and a frame mounted on the pivotal support and having rollers that collectively mount the horizontal beam on the upper end of the stanchion for pivotal movement about an associated vertical axis and for horizontal movement along its length; and
a wire bundle connected to its associated forming station at the distal end of the horizontal beam and extending therefrom along the horizontal beam to the stanchion to provide control of the forming station.

2. A glass sheet forming system as in claim 1 which includes a pair of storage locations at either of which any one of the forming stations not being used can be stored and at which any two of the forming stations not being used can be stored.

3. A glass sheet forming system as in claim 1 wherein the upper end of the stanchion of one of the control assemblies is located higher than the upper ends of the stanchions of the other two control assemblies so the horizontal beam of the one control assembly is movable above the horizontal beams of the other two control assemblies during forming station movement.

4. A glass sheet forming system as in claim 1 further including a rail assembly having rails and a turntable on which the forming stations are movable within the forming system.

5. A glass sheet forming system as in claim 4 wherein the stanchions of two control assemblies are respectively located upstream and downstream from the turntable along the direction of conveyance of the forming lines, and the stanchion of the other control assembly being located adjacent the stanchion of one of said two control assemblies.

6. A glass sheet forming system as in claim 5 wherein the stanchions of said two control assemblies are aligned with the turntable along the direction of conveyance and the stanchion of the other control assembly is located laterally relative to the direction of conveyance to one side of the stanchion of one of said two control assemblies and the upper end thereof is higher than the upper ends of the stanchions of said two control assemblies so the horizontal beam thereof is movable above the horizontal beams of said two control assemblies during forming station movement.

7. A glass sheet forming system as in claim 6 which includes a pair of storage locations located upstream and downstream from the turntable along the direction of conveyance of the forming lines to provide for storage of one or two of the forming stations not being used.

8. A glass sheet forming system comprising:
a pair of glass sheet forming lines extending alongside each other along a direction of conveyance of the forming system, each forming line including:
a heating furnace; and
a cooling station spaced downstream along the direction of conveyance from the heating furnace to define a forming location between the heating furnace and the cooling station;
three forming stations, any two of which can be respectively positioned at the forming locations of the pair of forming lines;
a pair of storage locations at either of which any one of the forming stations not being used can be stored and at which any two of the forming stations not being used can be stored;
a rail assembly having rails and a turntable on which the forming stations are movable within the forming system; and
three control assemblies respectively associated with the three forming stations and each including:
an upwardly extending stanchion having an upper end;
a horizontal beam having an elongated length including a distal end having a pivotal connection to its associated forming station;
a bearing assembly including a pivotal support and a frame mounted on the pivotal support and having rollers that collectively mount the horizontal beam on the upper end of the stanchion for pivotal movement about an associated vertical axis and for horizontal movement along its length; and a wire bundle connected to its associated forming station at the distal end of the horizontal beam and extending therefrom along the horizontal beam to the stanchion to provide control of the forming station.

9. A glass sheet forming system comprising:
a pair of glass sheet forming lines extending alongside each other along a direction of conveyance of the forming system, each forming line including:
   a heating furnace; and
   a cooling station spaced downstream along the direction of conveyance from the heating furnace to define a forming location between the heating furnace and the cooling station;
three forming stations, any two of which can be respectively positioned at the forming locations of the pair of forming lines;
a pair of storage locations at either of which any one of the forming stations not being used can be stored and at which any two of the forming stations not being used can be stored;
a rail assembly having rails and a turntable on which the forming stations are movable within the forming system; and
three control assemblies respectively associated with the three forming stations and each including:
   an upwardly extending stanchion having an upper end;
   a horizontal beam having an elongated length including a distal end having a pivotal connection to its associated forming station;
   a bearing assembly including a pivotal support and a frame mounted on the pivotal support and having rollers that collectively mount the horizontal beam on the upper end of the stanchion for pivotal movement about an associated vertical axis and for horizontal movement along its length;
   a wire bundle connected to its associated forming station at the distal end of the horizontal beam and extending therefrom along the horizontal beam to the stanchion to provide control of the forming station; and
the upper end of the stanchion of one of the control assemblies being located higher than the upper ends of the stanchions of the other two control assemblies so the horizontal beam of the one control assembly is movable above the horizontal beams of the other two control assemblies during forming station movement.

\* \* \* \* \*